(12) United States Patent
Takama et al.

(10) Patent No.: US 10,506,145 B2
(45) Date of Patent: Dec. 10, 2019

(54) CAMERA APPARATUS AND CAMERA MODULE

(71) Applicant: DENSO CORPORATION, Kariya, Aichi-pref. (JP)

(72) Inventors: Daisuke Takama, Kariya (JP); Yasuki Furutake, Kariya (JP); Soji Masui, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/446,834

(22) Filed: Mar. 1, 2017

(65) Prior Publication Data
US 2017/0257536 A1    Sep. 7, 2017

(30) Foreign Application Priority Data
Mar. 3, 2016 (JP) ................. 2016-041185

(51) Int. Cl.
*H04N 5/225* (2006.01)
*B60R 11/04* (2006.01)
*B60R 11/00* (2006.01)

(52) U.S. Cl.
CPC ........... *H04N 5/2254* (2013.01); *B60R 11/04* (2013.01); *H04N 5/2252* (2013.01); *H04N 5/2253* (2013.01); *H04N 5/2257* (2013.01); *B60R 2011/0026* (2013.01)

(58) Field of Classification Search
CPC .. H04N 5/2254; H04N 5/2252; H04N 5/2253; H04N 5/2257; B60R 11/04; B60R 2011/0026
See application file for complete search history.

(56) References Cited

U.S. PATENT DOCUMENTS

2010/0039553 A1* 2/2010 Kim ................. H04N 5/2254
                                                    348/374
2012/0013741 A1* 1/2012 Blake, III ............ B60R 11/00
                                                    348/148
2014/0160284 A1 6/2014 Achenbach et al.
(Continued)

FOREIGN PATENT DOCUMENTS

JP    2003-298891    10/2003
JP    2005-086659    3/2005
(Continued)

*Primary Examiner* — Junior O Mendoza
(74) *Attorney, Agent, or Firm* — Knobbe, Martens, Olson & Bear, LLP

(57) ABSTRACT

In a camera apparatus, a camera case is fixed to a windshield from within a cabin of a vehicle. A camera module includes an optical unit and a camera substrate. The optical unit includes a lens. The camera substrate includes an image sensor. The optical unit includes a lens barrel portion and a base portion. The lens barrel portion holds the lens therein. The base portion has a reference surface that serves as a reference for positioning when the camera module is fixed to the camera case and to which the lens barrel portion is fixed so as to have a fixed positional relationship. The camera substrate is fixed to the optical unit in a position in which an optical axis of the lens passes through a center of a light receiving surface of the image sensor and is perpendicular to the light receiving surface of the image sensor.

7 Claims, 8 Drawing Sheets

(56) References Cited

U.S. PATENT DOCUMENTS

| | | | | |
|---|---|---|---|---|
| 2015/0015713 A1* | 1/2015 | Wang | ................ | H04N 7/18 |
| | | | | 348/148 |
| 2015/0264234 A1* | 9/2015 | Wang | ................ | H04N 5/2254 |
| | | | | 348/148 |
| 2015/0273799 A1* | 10/2015 | Takama | ................ | H04N 5/2257 |
| | | | | 348/373 |
| 2016/0028929 A1 | 1/2016 | Nakamura et al. | | |
| 2017/0182944 A1 | 6/2017 | Achenbach et al. | | |

FOREIGN PATENT DOCUMENTS

| | | |
|---|---|---|
| JP | 2007-225991 | 9/2007 |
| JP | 2007-225991 A | 9/2007 |
| JP | 2010-278603 | 12/2010 |
| JP | 2013-055515 | 3/2013 |
| JP | 2013-117685 A | 6/2013 |
| JP | 2014-179795 A | 9/2014 |

* cited by examiner

CAMERA APPARATUS AND CAMERA MODULE

CROSS-REFERENCE TO RELATED APPLICATION

This application is based on and claims the benefit of priority from Japanese Patent Application No. 2016-041185, filed Mar. 3, 2016. The entire disclosure of the above application is incorporated herein by reference.

BACKGROUND

Technical Field

The present disclosure relates to a camera apparatus and a camera module for a vehicle.

Related Art

In recent years, there have been vehicles in which a camera is disposed on a windshield from within a cabin for the purpose of performing driving assistance control and the like. As a camera for use in a vehicle such as this, an on-board camera described in JP-A-2007-225991 is known. The on-board camera described in JP-A-2007-225991 includes a lens barrel and a case. The lens barrel has a lens and an approximately tube-shaped lens holding portion that holds the lens. The case has a lens barrel holding portion and a case main body portion. The lens barrel holding portion is approximately tube-shaped and holds the lens barrel. The case main body portion is approximately case-like and houses an image sensor therein. An end portion of the lens barrel is fitted into the lens barrel holding portion and fixed at a position at which focus is adjusted.

In general, the on-board camera such as that described above is fixed to a camera case, together with a hood that covers the lens of the on-board camera from below. The camera case to which the on-board camera and the hood are fixed is attached to a supporting member that is disposed on the windshield of the vehicle. The hood that covers the lens from below blocks light entering from below the lens and suppresses a situation in which scenery outside of the range of the angle of view of the on-board camera is reflected in the lens.

Conventionally, the relative position of a light receiving surface of the image sensor relative to an optical axis of the lens has been adjusted by four-axis adjustment. However, in four-axis adjustment, the tilt of the light receiving surface of the image sensor relative to the optical axis of the lens is not adjusted. Therefore, partial blur and the like may occur. Consequently, a six-axis adjustment technique has been proposed. In this technique, the tilt of the light receiving surface of the image sensor relative to the optical axis of the lens is also adjusted.

In the above-described on-board camera, when six-axis adjustment is applied to positioning of the lens barrel relative to the lens barrel holding portion, the lens barrel may tilt relative to the lens barrel holding portion. Here, the windshield of a typical vehicle is sloped. Therefore, when clearance between the camera case and the windshield is small, should the lens barrel tilt upwards, the windshield and the lens barrel come into contact. The camera case cannot be disposed. Consequently, the supporting member is required to be disposed on the windshield such that the clearance between the windshield and the camera case is of a size allowing leeway. However, when the clearance is increased, the hood for blocking light is required to be made larger. When the hood is made larger, the field of view from the windshield is blocked by this extent. Therefore, the hood is preferably small.

SUMMARY

It is thus desired to provide a camera apparatus that can be made smaller in size and a camera module that enables the camera apparatus to become smaller in size.

An exemplary embodiment provides a camera apparatus that includes a camera case and a camera module. The camera case is fixed to a windshield of a vehicle from within a cabin of the vehicle. The camera module includes an optical unit and a camera substrate, and is fixed to the camera case. The optical unit includes a lens. The camera substrate includes an image sensor and is fixed to an end portion of the optical unit. The optical unit includes a lens barrel portion and a base portion. The lens barrel portion holds the lens therein. The base portion has a reference surface that serves as a reference for positioning when the camera module is fixed to the camera case. The lens barrel portion is fixed to the base portion so as to have a fixed positional relationship. The camera substrate is fixed to the optical unit in a position in which an optical axis of the lens of the lens barrel portion fixed to the base portion passes through a center of a light receiving surface of the image sensor and is perpendicular to the light receiving surface of the image sensor.

In the exemplary embodiment, the optical unit is composed of the lens barrel portion and the base portion. The camera module is configured by the camera substrate being fixed to the end portion of the optical unit. The camera module is fixed to the camera case with reference to the reference surface of the base portion. Here, because the camera substrate is adjusted with respect to the optical unit, the lens barrel portion is not required to be adjusted with respect to the base portion. Therefore, tilting of the lens barrel portion relative to the reference surface of the base portion is suppressed. Consequently, when the camera apparatus is attached to the windshield, the tolerance from latching portions of the camera case that are latched onto supporting members on the windshield to the tip of the lens barrel portion becomes smaller than that when the lens barrel portion is adjusted by six-axis adjustment relative to the base portion. As a result, the clearance between the windshield and the camera case can be reduced, and the size of the hood can be reduced.

Reference numbers within the parentheses in the claims indicate corresponding relationships with specific means according to an embodiment described hereafter as one aspect, and do not limit the technical scope of the present disclosure.

DESCRIPTION OF THE EMBODIMENTS

An embodiment of a camera module and a camera apparatus will hereinafter be described with reference to the drawings.

1. Configuration

Figure 1:
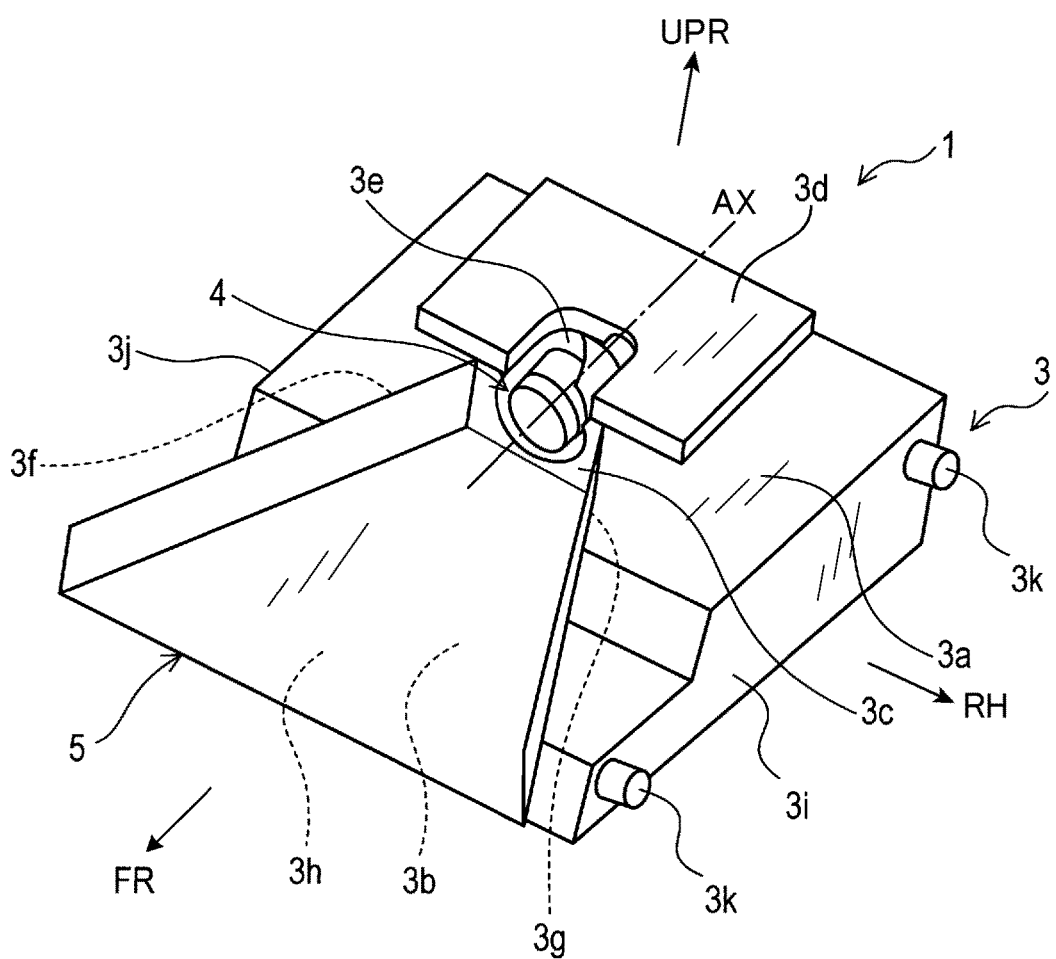
FIG. 1 is a perspective view of an outer appearance of a camera apparatus.

As shown in FIG. 1, a camera apparatus 1 includes a camera case 3, a camera module 4, and a hood 5. The camera apparatus 1 is an on-board camera that is attached, from within a cabin 101 of a vehicle 100 (see FIGS. 7 and 8), to a bracket (not shown) that is fixed to a windshield 7 (see FIGS. 7 and 8) of the vehicle 100. Hereafter, frontward, rearward, leftward, rightward, upward, and downward directions of each component of the camera apparatus 1 are defined as the frontward, rearward, leftward, rightward, upward, and downward directions of the component in a state in which the camera apparatus 1 is attached to the windshield 7. That is, based on this definition, the frontward direction of a component coincides with the direction ahead of the vehicle 100. In addition, FR, UPR, and RH directions in the drawings respectively indicate the frontward direction, the upward direction, and the rightward direction.

The camera case 3 is a box-shaped component composed of metal or resin. The camera case 3 is shaped such that the thickness decreases towards the front side. The camera module 4 is fixed within the camera case 3. The hood 5 is fixed to a front portion of the camera case 3. A top surface 3a of the camera case 3 includes a front planar portion 3b, an erected planar portion 3c, and a rear planar portion 3d. The front planar portion 3b, the erected planar portion 3c, and the rear planar portion 3d are three surfaces having differing slope angles. The front planar portion 3b is a surface that extends in the frontward, rearward, leftward, and rightward directions. The erected planar portion 3c is a surface that is erected upwards at a rear-side end portion of the front planar portion 3b. In addition, the rear planar portion 3d is a surface that extends in the rearward direction at the upper-side end portion of the erected planar portion 3c.

Here, an exposure hole 3e is formed from the center of the erected planar portion 3c in the upward-downward direction towards the vicinity of the front portion of the rear planar portion 3d. The camera module 4 is exposed from the exposure hole 3e. In addition, the front planar portion 3b has a trapezoidal planar shape. Inner side surfaces 3f and 3g are formed on both the left and right sides of the front planar portion 3b so as to extend in the upward direction. A trapezoidal recess 3h is formed by the front planar portion 3b, the inner surfaces 3f and 3g, and the erected planar portion 3c. The hood 5 is fitted into the recess 3h. Therefore, of the surfaces forming the recess 3h, the front planar portion 3b and the inner side surfaces 3f and 3g are hidden under the hood 5.

In addition, a total of four latching portions 3k are provided on a left outer side surface 3i and a right outer side surface 3j of the outer side surfaces of the camera case 3. The left outer side surface 3i is positioned in the leftward direction. The right outer side surface 3j is positioned in the rightward direction. Each latching portion 3k is provided near the top surface 3a and protrudes in a circular columnar shape. Four hook portions (not shown) are provided in the bracket that is fixed to the windshield 7. The camera case 3 is fixed to the windshield 7 by the four latching portions 3k respectively latching onto the hook portions of the bracket.

The hood 5 is a black-colored component that is composed of resin. The hood 5 has a trapezoidal bottom wall and a pair of side surfaces that stand erect on the left and right sides of the bottom wall. The hood 5 is fitted into the recess 3h of the camera case 3 and fixed thereto. The hood 5 covers a lens 41, described hereafter, from below. The lens 41 is exposed from the exposure hole 3e in the camera case 3. As a result of the hood 5 being arranged in this way, light that enters from below the lens 41, such as light reflected by a dashboard 8 (see FIGS. 7 and 8) of the vehicle 100, is blocked. As a result, scenery, such as a dashboard 8 of the vehicle 100, that is, scenery outside of the angle of view of the camera module 4 is suppressed from being reflected in the lens 41.

Figure 2:
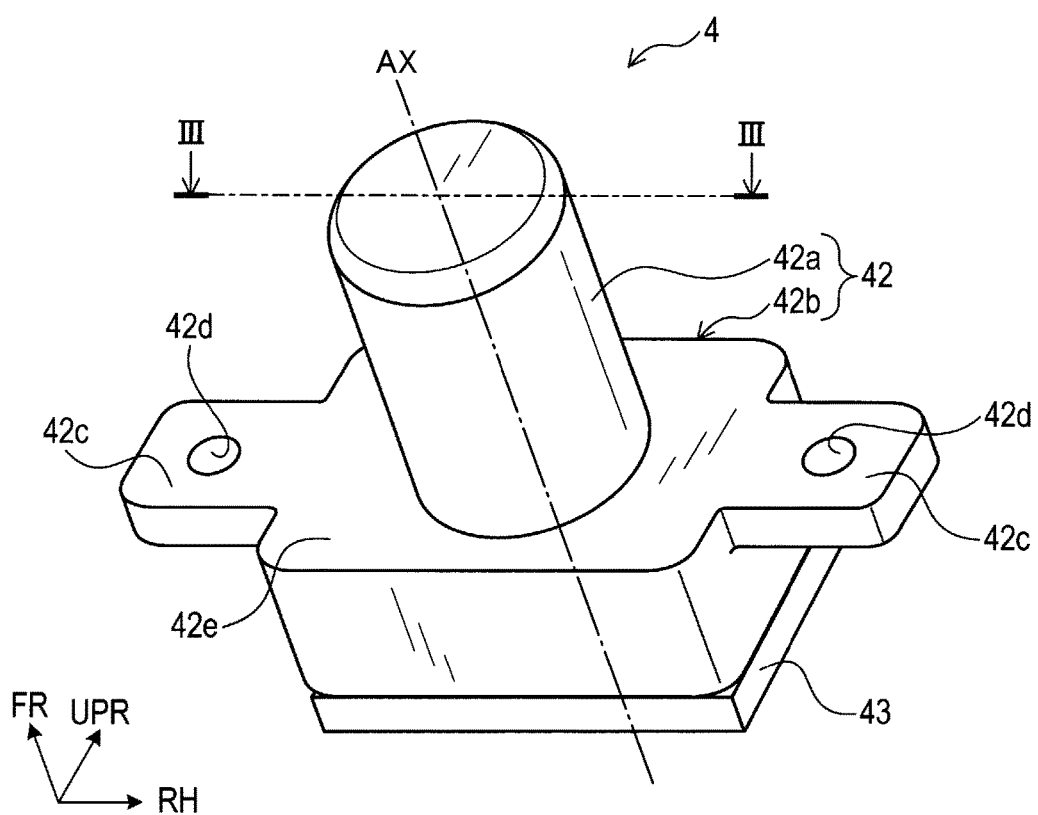
FIG. 2 is a perspective view of an outer appearance of a camera module.

Next, a configuration of the camera module 4 will be described with reference to FIG. 2 and FIG. 3. The camera module 4 is a single-lens camera that includes an optical unit 42 and a camera substrate 43.

The optical unit 42 includes a lens barrel portion 42a and a base portion 42b. The lens barrel portion 42a and the base portion 42b are integrally molded with resin. Thermoplastic resin, such as polyphenylene sulfide (PPS) resin, is used as the resin.

The lens barrel portion 42a is tube-shaped and holds the lens 41 therein. The lens 41 is composed of a plurality of lenses of differing sizes. The lenses of the lens 41 are arrayed in a direction of an optical axis AX of the lens 41 such that the optical axis AX coincides with a center axis of the lens barrel portion 42a. The inner wall of the lens barrel portion 42a is formed so as to surround the periphery of each lens of the lens 41. As a result, the lenses of the lens 41 are positioned within the lens barrel portion 42a.

Figure 3:
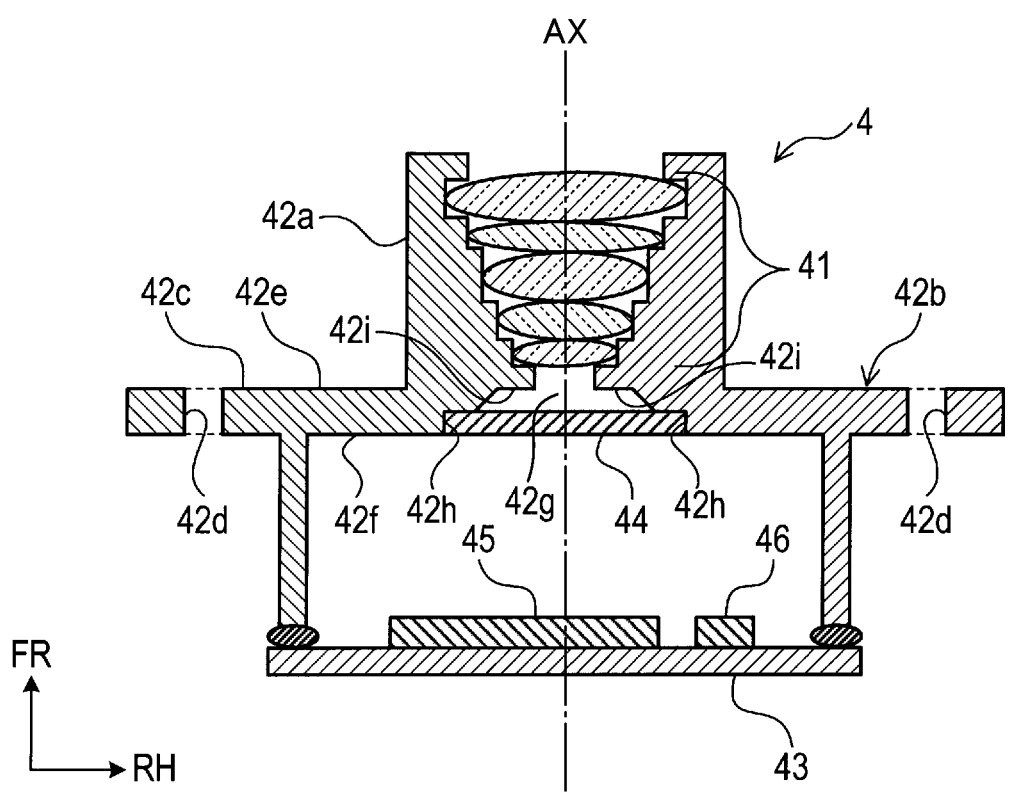
FIG. 3 is a cross-sectional view taken along line III-III in FIG. 2.

According to the present embodiment, as shown in FIG. 3, the lenses of the lens 41 are arranged such that the size of the lens 41 becomes smaller towards the rear. The inner diameter of the lens barrel portion 42a also becomes smaller. As a result of the lens barrel portion 42a being shaped in this manner, a mold for forming the inner wall surface of the lens barrel portion 42a can be removed from the front of the lens barrel portion 42a. Therefore, the lens barrel portion 42a and the base portion 42b can be integrally molded with ease.

After the lenses of the lens 41 are successively housed and positioned within the lens barrel portion 42a, the inner wall of the lens barrel portion 42a in the rear portion of the lens of the lens 41 closest to the base portion 42b side is heated. The shape of the inner wall is deformed and a fixing portion 42i is formed. The lens 41 is fixed to the interior of the tube-shaped wall by the fixing portion 42i that is integrally formed with the resin forming the tube-shaped wall of the lens barrel portion 42a. That is, after the lens 41 is housed in the lens barrel portion 42a, the lens 41 is fixed within the lens barrel portion 42a by thermal caulking.

The base portion 42b has a rectangular parallelepiped shape that extends in the direction perpendicular to the optical axis AX of the lens 41 and is open at the rear. Specifically, the base portion 42b includes a plate-shaped reference surface 42e and plate-shaped side surfaces. The reference surface 42e serves as a reference for positioning when the camera module 4 is fixed to the camera case 3. The side surfaces are upper, lower, left, and right side surfaces that stand erect from the reference surface 42e. The lengths of the upper, lower, left, and right side surfaces in the frontward-rearward direction are all identical. Furthermore, the base portion 42b includes an attaching portion 42c for fixing the camera module 4 to the camera case 3. The attaching portion 42c is a plate-shaped portion that extends in the leftward direction and the rightward direction from the reference plate 42e. The attaching portion 42c and the surface of the reference surface 42e on the frontward side are formed flush with each other. Screw holes 42d are formed in the attaching portion 42c.

The reference surface 42e is provided with a through hole 42g that passes through the reference surface 42e in the center portion of the reference surface 42e. The through hole 42g is formed such that the diameter thereof is smaller than the diameter of the lens barrel portion 42a. The lens barrel portion 42a is disposed on the outer wall surface side of the reference surface 42e in a position covering the through hole 42g. That is, the interior of the lens barrel portion 42a and the through hole 42g are communicated with each other. An inner wall surface 42f of the reference surface 42e is provided with a fixing groove 42h for fixing an optical filter 44. The fixing groove 42h is formed so as to be coupled to the inner wall surface of the through hole 42g and to surround the through hole 42g.

The optical filter 44 cuts off light of a predetermined wavelength. For example, the optical filter 44 is an infrared cut-off filter that cuts off infrared rays. The infrared cut-off filter is provided between the lens 41 and the image sensor 45, described hereafter. Thus, when imaging is performed in an environment that has a large amount of infrared rays, such as outdoors, a situation in which the image becomes white as a result of saturation of electrical charge is suppressed. The optical filter 44 is fixed to the fixing groove 42h formed in the reference surface 42e by an adhesive.

The shape of the lens barrel portion 42a is symmetrical with respect to the optical axis AX of the lens 41. The shape of the base portion 42b is symmetrical with respect to the optical axis AX of the lens 41. Here, when the lens barrel portion 42a and the base portion 42b are integrally molded with resin, a problem occurs in that it is difficult to obtain accuracy of the components. According to the present embodiment, as a result of the shapes of the lens barrel portion 42a and the base portion 42b being simple, decrease in accuracy of the components accompanying integral molding with resin can be suppressed.

The camera substrate 43 is a plate-shaped component on which the image sensor 45 and a connector 46 are mounted. According to the present embodiment, the connector 46 is mounted on the same side of the plate-shaped component as the image sensor 45. However, the connector 46 may be mounted on the opposite side of the plate-shaped component. The camera substrate 43 is assembled in the open end portion at the rear of the base portion 42b such that the surface on which the image sensor 45 is mounted faces the front. That is, the camera substrate 43 is assembled in the rear end portion of the base portion 42b such that the image sensor 45 opposes the optical filter 44 disposed in the inner wall surface of the reference surface 42e.

In a state in which the camera substrate 43 and the base portion 42b are assembled together, the camera substrate 43 and the base portion 42b are shaped such that relative positions thereof can be adjusted, rather than to fit closely together and mutually restrict movement. As described hereafter, the camera substrate 43 and the base portion 42b are fixed using an adhesive in a state in which the relative positions thereof are adjusted.

The image sensor 45 is a semiconductor image sensor element such as a charge-coupled device (CCD) image sensor or a complementary metal-oxide semiconductor (CMOS) image sensor. The image sensor 45 has a rectangular plate shape. The surface of the image sensor 45 is configured by a light receiving surface that forms a single plane. The image sensor 45 picks up a subject image formed on the light receiving surface by the lens 41 and outputs an image signal. At this time, when the light receiving surface of the image sensor 45 tilts with respect to the optical axis AX of the lens 41, partial blur or the like occurs and the quality of the image deteriorates. Therefore, the optical unit 42 and the camera substrate 43 are required to be positioned such that the light receiving surface of the image sensor 45 is accurately perpendicular to the optical axis AX of the lens 41. Adjustment of the relative positions of the optical unit 42 and the camera substrate 43 will be described hereafter.

Figure 4:
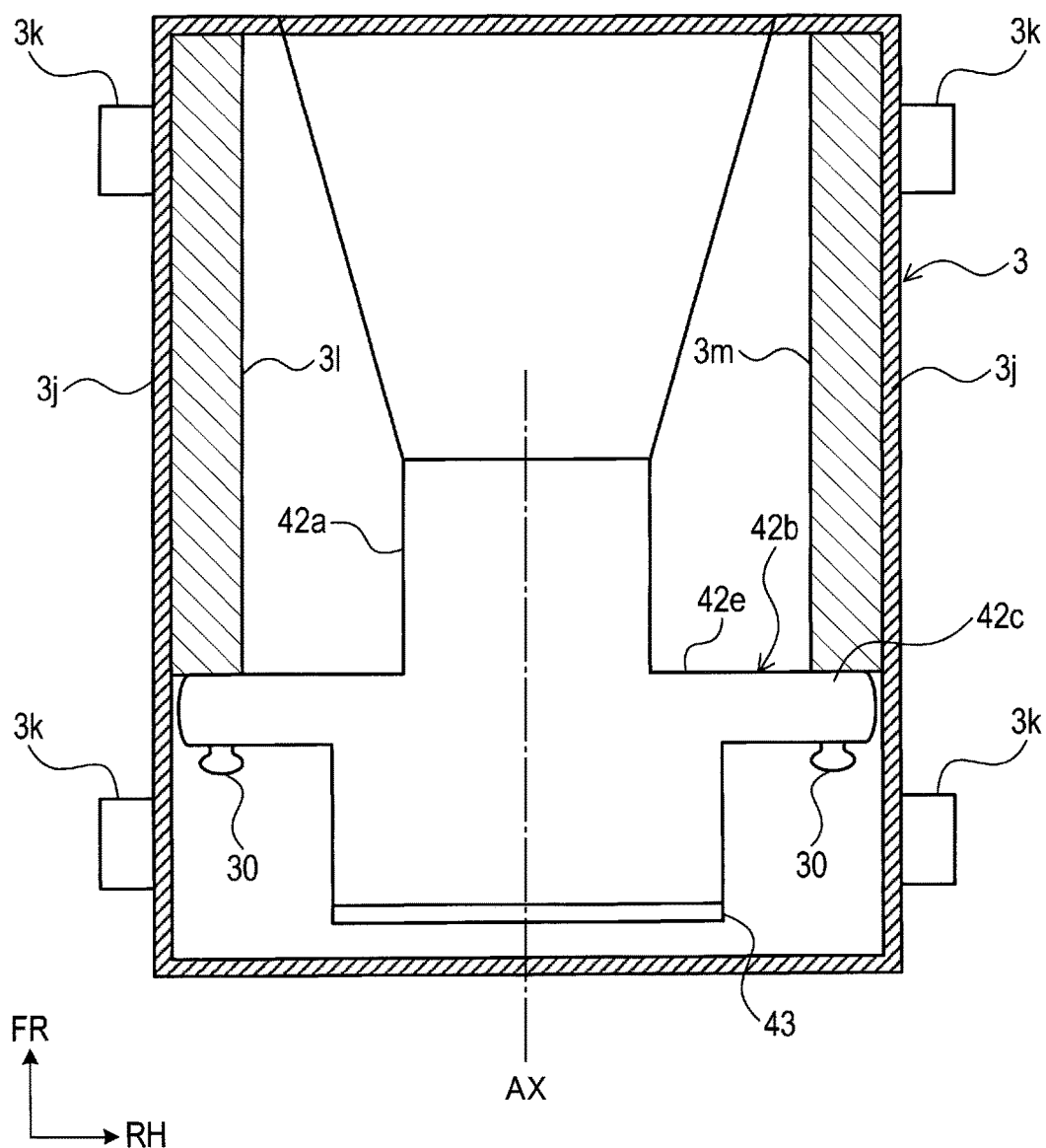
FIG. 4 is a top view of an interior of a camera case.

As shown in FIG. 4, the camera module 4 is fixed to the camera case 3 with the surface of the reference surface 42e serving as reference for positioning. That is, the camera module 4 is fixed to the camera case 3 by the attaching portion 42c being fastened with screws 30 to a left side-surface inner wall 31 and a right side-surface inner wall 3m of the camera case 3.

In the camera case 3, a signal processing substrate and connection wiring (not shown) are arranged below the camera module 4. The signal processing substrate is a plate-shaped component that processes the image signals acquired by the camera module 4. The signal processing substrate is fixed to the camera case 3 below the camera module 4. The signal processing substrate is provided with a connector. The connector of the signal processing substrate and the connector 46 of the camera substrate 43 are electrically connected by the connection wiring. Here, a component that captures the subject image and generates the image signal is referred to as the camera module 4. The entirety of the camera module 4 further including components such as the signal processing substrate, the connection wiring, the camera case 3, and the hood 5 is referred to as the camera apparatus 1.

Figure 5:
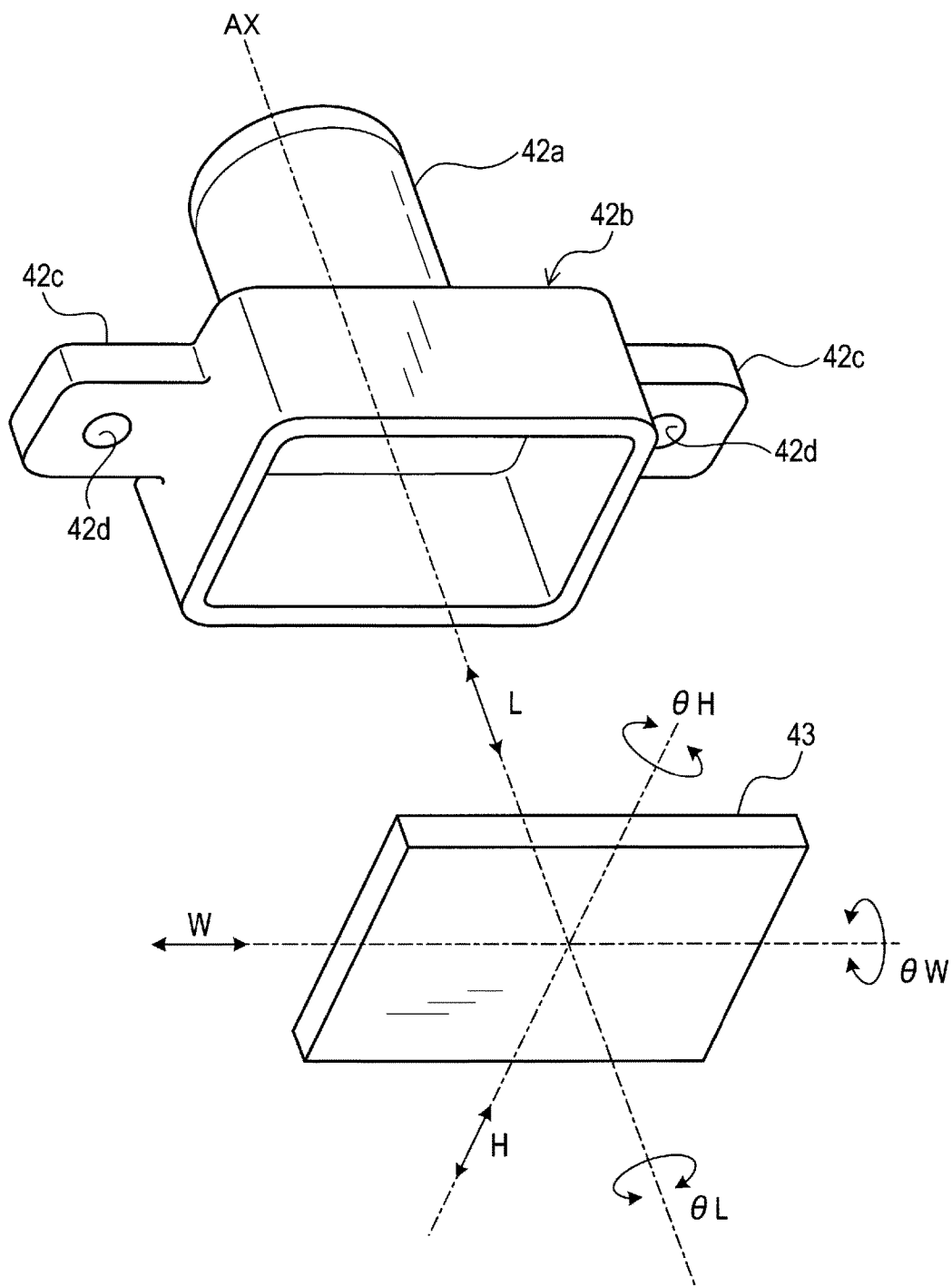
FIG. 5 is an exploded perspective view of the camera module.

Next, adjustment of the relative positions of the optical unit 42 and the camera substrate 43, and fixing of the optical unit 42 and the camera substrate 43 will be described with reference to FIG. 5. As described above, the relative positions of the optical unit 42 and the camera substrate 43 can be adjusted in a state in which the optical unit 42 and the camera substrate 43 are assembled together. Taking advantage of this degree of freedom, the relative position of the camera substrate 43 relative to the optical unit 42 is adjusted by six-axis adjustment.

That is, the camera substrate 43 is fixed to the optical unit 42 in a position in which the optical axis AX of the lens 41 passes through the center of the light receiving surface of the image sensor 45 and is perpendicular to the light receiving surface of the image sensor 45. Six-axis adjustment herein refers to adjustment in translational directions in the x axis, y axis, and z axis, and a rotational direction around each axis. According to the present embodiment, the relative positions of the optical unit 42 and the camera substrate 43 are adjusted by the shape of the adhesive, such as the thickness or spread of the adhesive, being adjusted.

2. Mounting in Vehicle

Next, a state in which the camera apparatus 1 is mounted in a vehicle 100 will be described with reference to FIGS. 7 and 8. The optical unit 42 is integrally molded with resin. Therefore, the angle of the lens barrel portion 42a relative to the reference surface 42e of the base portion 42b is fixed.

Consequently, total tolerance from the latching portions 3k of the camera case 3 to the tip of the lens barrel holder 42a is a sum of the tolerance from the latching portions 3k to the reference surface 42e and the tolerance from the reference surface 42e to the tip of the lens barrel portion 42a.

Figure 6:
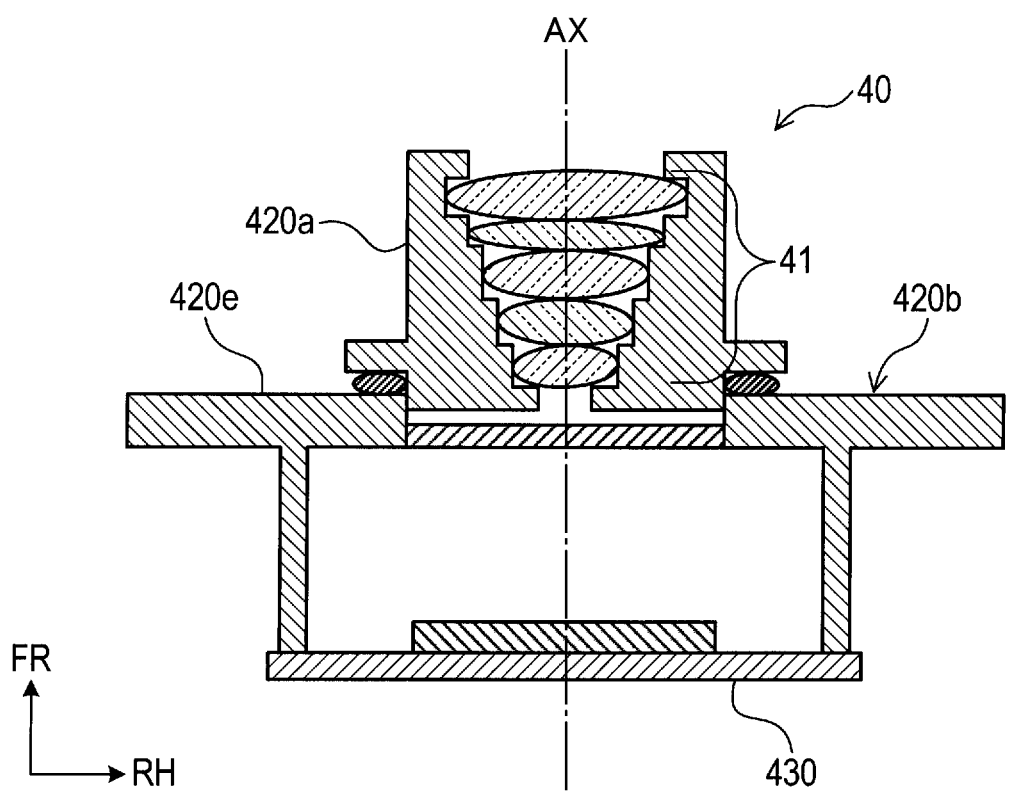
FIG. 6 is a cross-sectional view corresponding to FIG. 4, in a case in which a lens barrel portion and a base portion are separate components.

In this regard, in cases in which a lens barrel portion 420a and a base portion 420b are separate components and the relative position of the lens barrel portion 420a relative to the base portion 420b is adjusted by six-axis adjustment as in a camera module 40 shown in FIG. 6, the angle of the lens barrel portion 420a relative to a reference surface 420e of the base portion 420b may become large. In this case, the total tolerance is the sum of the tolerance from the latching portions 3k to the reference surface 42e, the tolerance from the reference surface 420e to an adhesion portion between the lens barrel portion 420a and the base portion 420b, and the tolerance from the adhesion portion to the tip of the lens barrel portion 42a. Therefore, the total tolerance of the camera module 40 becomes greater than that according to the present embodiment.

Figure 7:
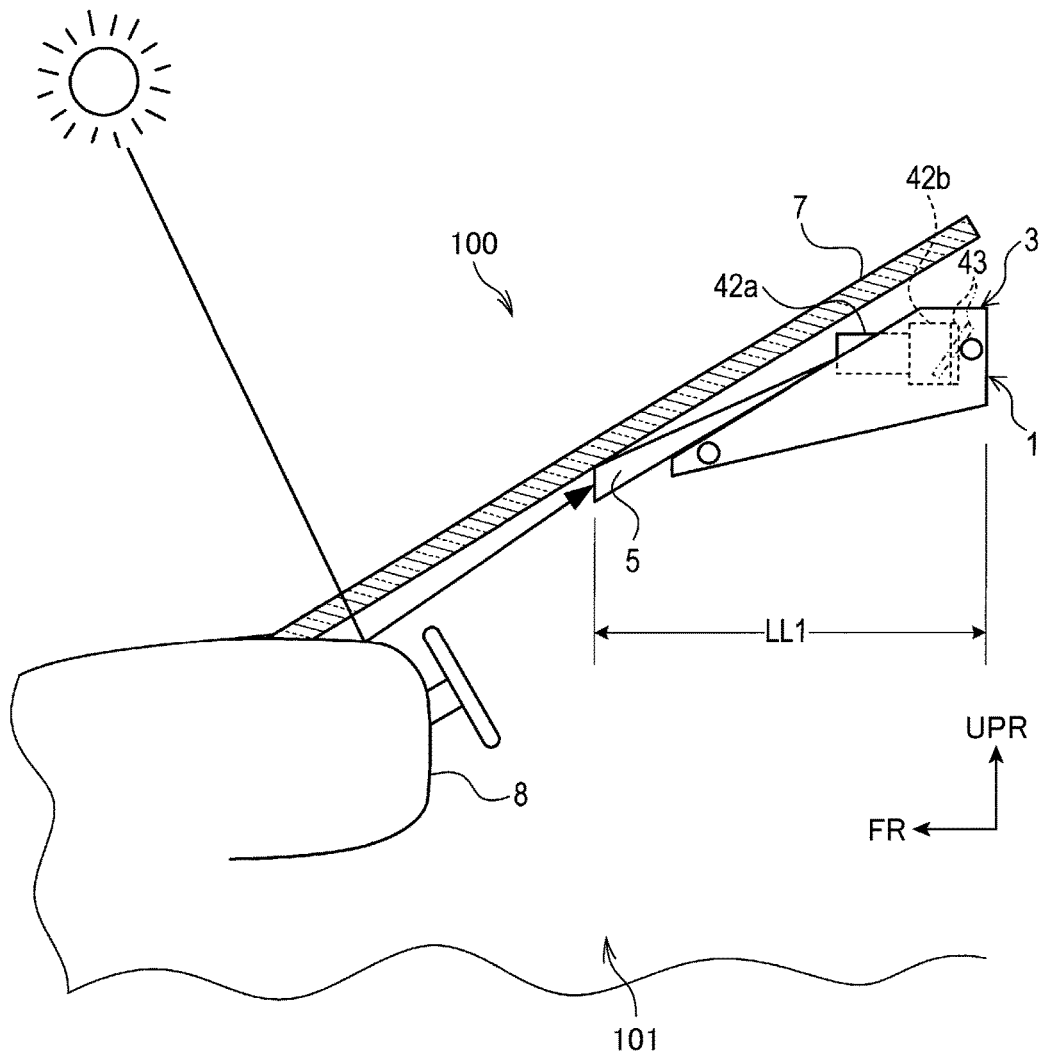
FIG. 7 is a side view schematically showing a state in which the camera apparatus of the present embodiment is attached to a windshield of a vehicle.
Figure 8:
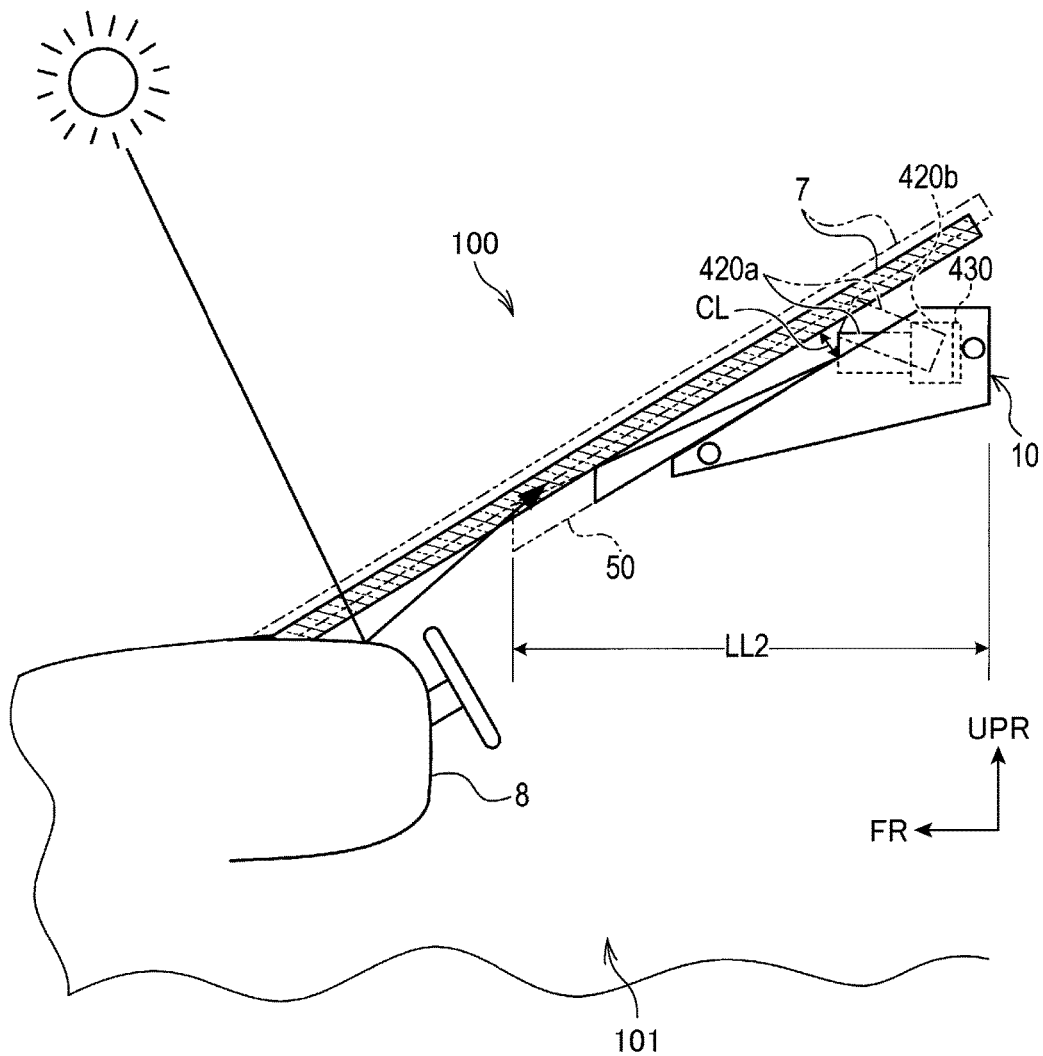
FIG. 8 is a side view schematically showing a state in which a camera apparatus in which the lens barrel portion and the base portion are separate components is attached to the windshield.

As shown in FIG. 7, because the total tolerance is relatively small, when the camera apparatus 1 is mounted in the vehicle 100, clearance CL between the windshield 7 and the camera case 3 can be made relatively small. As a result, the size in the frontward-rearward direction of the hood 5 that is disposed between the windshield 7 and the camera case 3 and that covers the lens 41 from below can be made relatively small. In this case, the size in the frontward-rearward direction of the hood 5, that is, the distance from the frontward tip of the hood 5 to the rear surface of the camera case 3 becomes LL1 as shown in FIG. 7.

In the camera apparatus 1, the relative position of the camera substrate 43 to the camera module 4 is adjusted by six-axis adjustment. Therefore, the camera substrate 43 may tilt with respect to the reference surface 42e. Consequently, in the camera apparatus 1, clearance CL2 between the rear surface of the camera module 4 and the rear surface of the camera case 3 is required to be greater than that when the relative position of the lens barrel portion 42a relative to the base portion 42b is adjusted by six-axis adjustment. Here, when the connector 46 is mounted on the same side of the substrate as the image sensor 45, the clearance CL2 can be reduced.

In general, the range of the angle of view of the lens 41 of the camera apparatus 1 is disposed such that a white line on the road surface is captured. Therefore, the hood 5 is formed such that the height in the upward-downward direction is low and the length in the frontward-rearward direction is long, so as not to enter the range of the angle of view of the lens 41. The hood 5 fills the area between the windshield 7 and the camera case 3 in this manner. Therefore, when the clearance CL1 is sufficiently small, the size in the frontward-rearward direction of the hood 5 can be suppressed. However, as the clearance CL1 increases, the size in the frontward-rearward direction of the hood 5 rapidly increases.

When a camera apparatus 10 in which the camera module 40 is fixed to the camera case 3 is mounted in a vehicle 100, the tolerance increases compared to that of the camera apparatus 1. As indicated by broken lines in FIG. 8, because the windshield 7 of a typical vehicle 100 is sloped towards an interior of a cabin 101 of the vehicle 100, when the total tolerance is large, the camera apparatus 10 cannot be mounted to the vehicle 100 unless the clearance CL1 is made large. Therefore, when the camera apparatus 10 is mounted to the vehicle 100, the clearance CL1 becomes relatively large. As a result, the size in the frontward-rearward direction of the hood 50 increases. The size in the frontward-rearward direction of the camera apparatus 10 becomes LL2 that is greater than the size in the frontward-rearward direction of the camera apparatus 1. The camera apparatus 10 becomes larger in size than the camera apparatus 1.

3. Effects

According to the embodiment described in above, the following effects are achieved.

(1) The optical unit 42 is formed such that the lens barrel portion 42a and the base portion 42b are integrally molded with resin. Therefore, the angle of the lens barrel portion 42a relative to the reference surface 42e of the base portion 42b is fixed. Consequently, when the camera apparatus 1 is fixed to the camera case 3, the tolerance from the latching portions 3k of the camera case 3 to the tip of the lens barrel portion 42a can be reduced. Furthermore, the size of the hood 5 can be reduced and the camera apparatus 1 can be made smaller in size.

(2) Even when the lens barrel portion 42a and the base portion 42b are an integrated component, the relative positions between the lens 41 and the image sensor 45 can be disposed to appropriate positions as a result of the camera substrate 43 being adjusted by six-axis adjustment. Specifically, the relative positions of the lens 41 and the image sensor 45 can be disposed to positions such that the optical axis AX of the lens 41 passes through the center of the light receiving surface of the image sensor 45 and is perpendicular to the light receiving surface of the image sensor 45.

(3) The optical unit 42 has a relatively simple shape. Therefore, the optical unit 42 can be easily integrally molded with resin and accuracy of the optical unit 42 can be easily obtained.

Other Embodiments

A mode for carrying out the present disclosure is described above. However, the present disclosure is not limited to the above-described embodiment. Various modifications are possible.

(1) According to the above-described embodiment, the lens barrel portion 42a and the base portion 42b are integrally molded with resin. However, the present disclosure is not limited thereto. For example, the lens barrel portion 42a and the base portion 42b may be integrally molded with metal. In addition, the lens barrel portion 42a and the base portion 42b may be separate components. The lens barrel portion 42a may be fastened with screws or with an adhesive onto the base portion 42b so as to have a fixed positional relationship. In this case, the total tolerance increases compared to that when the lens barrel portion 42a and the base portion 42b are integrated. However, the total tolerance can be reduced compared to that when the relative position of the lens barrel portion 42a to the base portion 42b is adjusted by six-axis adjustment. Furthermore, the camera apparatus 1 can be made smaller in size.

(2) According to the above-described embodiment, adjustment of the relative positions of the optical unit 42 and the camera substrate 43 is performed by the shape of the adhesive being adjusted. However, the present disclosure is not limited thereto. For example, the relative positions of the optical unit 42 and the camera substrate 43 may be adjusted by a shim component or the like being placed between the end portion of the base portion 42b and the camera substrate 43.

(3) According to the above-described embodiment, the camera module 4 is fixed to the camera case 3 with screws.

However, the present disclosure is not limited thereto. For example, the camera module 4 may be fixed to the camera case 3 using an adhesive.

(4) A plurality of functions provided by a single constituent element according to the above-described embodiment may be actualized by a plurality of constituent elements. Alternatively, a single function provided by a single constituent element may be actualized by a plurality of constituent elements. In addition, a plurality of functions provided by a plurality of constituent elements may be actualized by a single constituent element. Alternatively, a single function provided by a plurality of constituent elements may be actualized by a single constituent element. Furthermore, a part of a configuration according to the above-described embodiments may be omitted. In addition, at least a part of a configuration according to an above-described embodiment may be added to or replace a configuration according to another above-described embodiment. All aspects included in the technical concept identified solely by the expressions recited in the claims are embodiments of the present disclosure.

What is claimed is:

1. A camera apparatus comprising:
    a camera case that is fixed to a windshield of a vehicle from within a cabin of the vehicle; and
    a camera module that includes an optical unit and a camera substrate, and is fixed to the camera case, the optical unit including a lens, and the camera substrate including an image sensor and being fixed to an end portion of the optical unit,
    the optical unit including a lens barrel portion and a base portion, the lens barrel portion holding the lens therein, and the base portion having:
        a reference surface that serves as a reference for positioning the camera module relative to the camera case for fixing the camera module to the camera case and to which the lens barrel portion is fixed so as to have a fixed positional relationship; and
        an attaching portion for fixing the camera module to the camera case, the attaching portion having a first surface;
    wherein the reference surface of the base portion faces an inner wall of the camera case and is parallel to the image sensor and the inner wall of the camera case, wherein the optical unit has a structure in which the lens barrel portion and the base portion are integrally molded, and wherein the reference surface and the first surface are parallel,
    the camera substrate being fixed to the optical unit in a position in which an optical axis of the lens passes through a center of a light receiving surface of the image sensor and is perpendicular to the light receiving surface of the image sensor.

2. The camera apparatus according to claim 1, wherein:
    the optical unit has a symmetrical shape with respect to the optical axis of the lens.

3. The camera apparatus according to claim 1, wherein:
    the camera substrate and the base portion are fixed using an adhesive.

4. The camera apparatus according to claim 1, wherein:
    the lens barrel comprises an inner wall having a first and second portion directly connected to each other, the first portion having a first face and a first diameter, the second portion having a second face and a second diameter, wherein the first face and second face are parallel and the first diameter is larger than the second diameter.

5. A camera module that is fixed to a camera case fixed to a windshield of a vehicle from within a cabin of the vehicle, the camera module comprising:
    an optical unit that includes a lens; and
    a camera substrate that includes an image sensor and is fixed to an end portion of the optical unit,
    the optical unit including a lens barrel portion and a base portion, the lens barrel portion holding the lens therein, and the base portion having:
        a reference surface that serves as a reference for positioning the camera module relative to the camera case for fixing the camera module is fixed to the camera case and to which the lens barrel portion is fixed so as to have a fixed positional relationship; and
        an attaching portion for fixing the camera module to the camera case, the attaching portion having a first surface;
    wherein the reference surface of the base portion faces an inner wall of the camera case and is parallel to the image sensor and the inner wall of the camera case, and wherein the optical unit has a structure in which the lens barrel portion and the base portion are integrally molded, and wherein the reference surface and the first surface are parallel, and
    the camera substrate being fixed to the optical unit in a position in which an optical axis of the lens passes through a center of a light receiving surface of the image sensor and is perpendicular to the light receiving surface of the image sensor.

6. The camera apparatus according to claim 5, wherein:
    the camera substrate and the base portion are fixed using an adhesive.

7. A camera apparatus comprising:
    a camera case that is fixed to a windshield of a vehicle from within a cabin of the vehicle; and
    a camera module that includes an optical unit and a camera substrate, and is fixed to the camera case, the optical unit including a lens, and the camera substrate including an image sensor and being fixed to an end portion of the optical unit,
    the optical unit including a lens barrel portion and a base portion, the lens barrel portion holding the lens therein, and the base portion having:
        a reference surface that serves as a reference for positioning the camera module relative to the camera case for fixing the camera module to the camera case and to which the lens barrel portion is fixed so as to have a fixed positional relationship,
    wherein the reference surface of the base portion is a surface on a first side opposite to a second side at which the image sensor is positioned, with respect to the base portion, faces an inner wall of the camera case and is parallel to the image sensor and the inner wall of the camera case, and wherein the optical unit has a structure in which the lens barrel portion and the base portion are integrally molded,
    the camera substrate being fixed to the optical unit in a position in which an optical axis of the lens passes through a center of a light receiving surface of the image sensor and is perpendicular to the light receiving surface of the image sensor.

* * * * *